United States Patent
Miller

(10) Patent No.: US 12,544,856 B2
(45) Date of Patent: Feb. 10, 2026

(54) LASER STRIP PROCESSING

(71) Applicant: MOUND LASER & PHOTONICS CENTER, INC., Nashua, NH (US)

(72) Inventor: Daniel B. Miller, Roberts, WI (US)

(73) Assignee: MOUND LASER & PHOTONICS CENTER, INC., Nashua, NH (US)

( * ) Notice: Subject to any disclaimer, the term of this patent is extended or adjusted under 35 U.S.C. 154(b) by 836 days.

(21) Appl. No.: 17/867,799

(22) Filed: Jul. 19, 2022

(65) Prior Publication Data

US 2023/0014024 A1    Jan. 19, 2023

Related U.S. Application Data

(60) Provisional application No. 63/223,365, filed on Jul. 19, 2021.

(51) Int. Cl.
*B23K 26/082*    (2014.01)
*B23K 26/08*    (2014.01)

(52) U.S. Cl.
CPC ........ *B23K 26/082* (2015.10); *B23K 26/0853* (2013.01); *B65H 2406/31* (2013.01)

(58) Field of Classification Search
CPC .............. B23K 26/082; B23K 26/0853; B65H 2406/31
See application file for complete search history.

(56) References Cited

U.S. PATENT DOCUMENTS

| | | | |
|---|---|---|---|
| 2016/0074959 A1* | 3/2016 | Maeda | B23K 26/53 425/142 |
| 2016/0354863 A1* | 12/2016 | Hirata | H10D 62/8325 |
| 2019/0126397 A1* | 5/2019 | Nomaru | B23K 26/0823 |

FOREIGN PATENT DOCUMENTS

CN    104023898 A    *    9/2014    ........... G02B 26/101

OTHER PUBLICATIONS

Translation of CN-104023898-A (Year: 2014).*

* cited by examiner

*Primary Examiner* — Elizabeth M Kerr
(74) *Attorney, Agent, or Firm* — McLane Middleton, Professional Association

(57) ABSTRACT

System and method of laser processing a section of web, or "strip" in a "step and repeat" manner while doing so with a continuously moving web during laser processing. The combination of continuous laser processing with a step and repeat manner of cutting parts from the strip, increases throughput for parts. The method includes retracting and indexing a web between passes of continuous laser processing of the web of material and alternating laser processing between two webs in a dual web system further increases throughput results from laser processing.

15 Claims, 14 Drawing Sheets

KEY TO

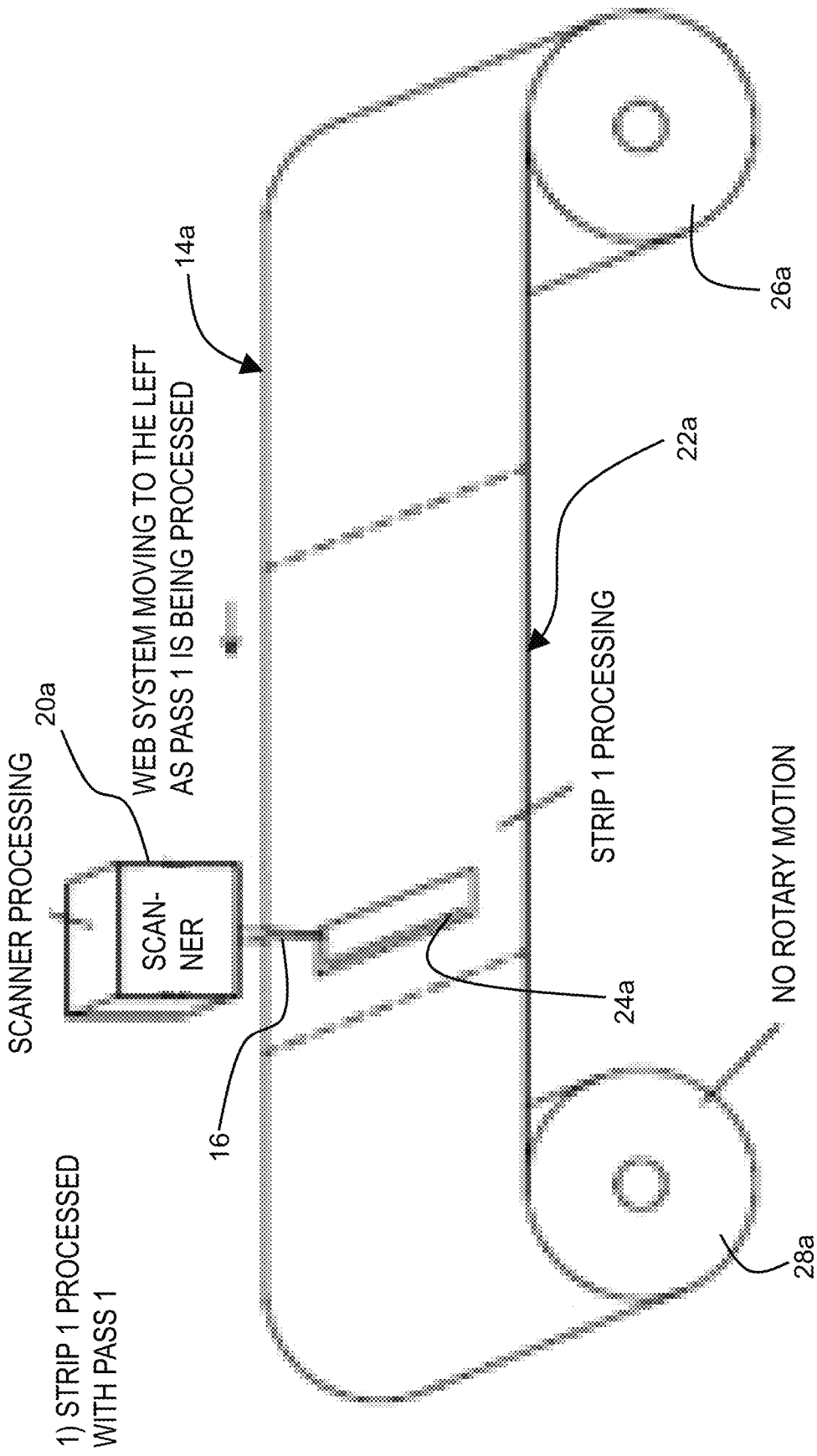

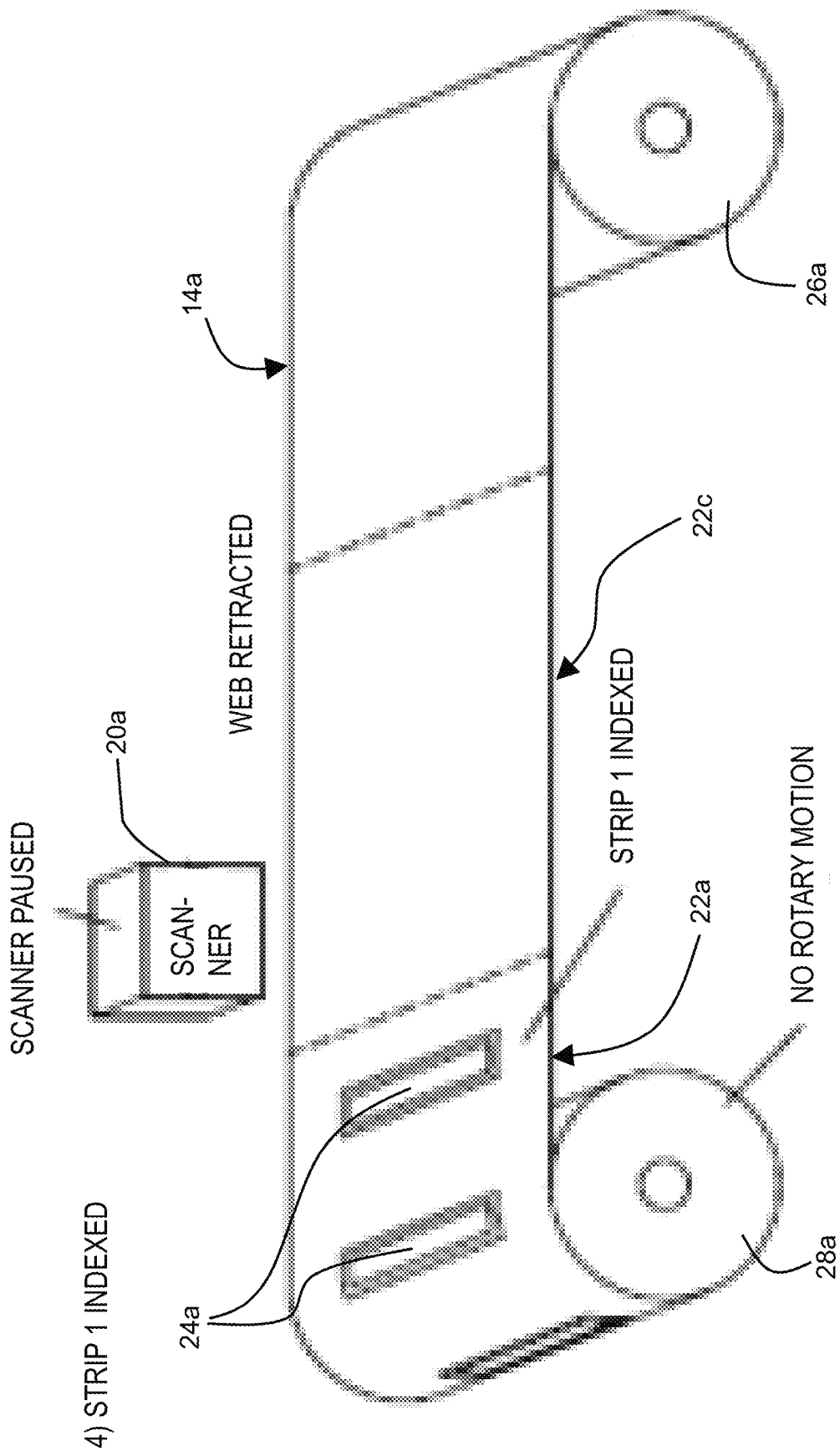

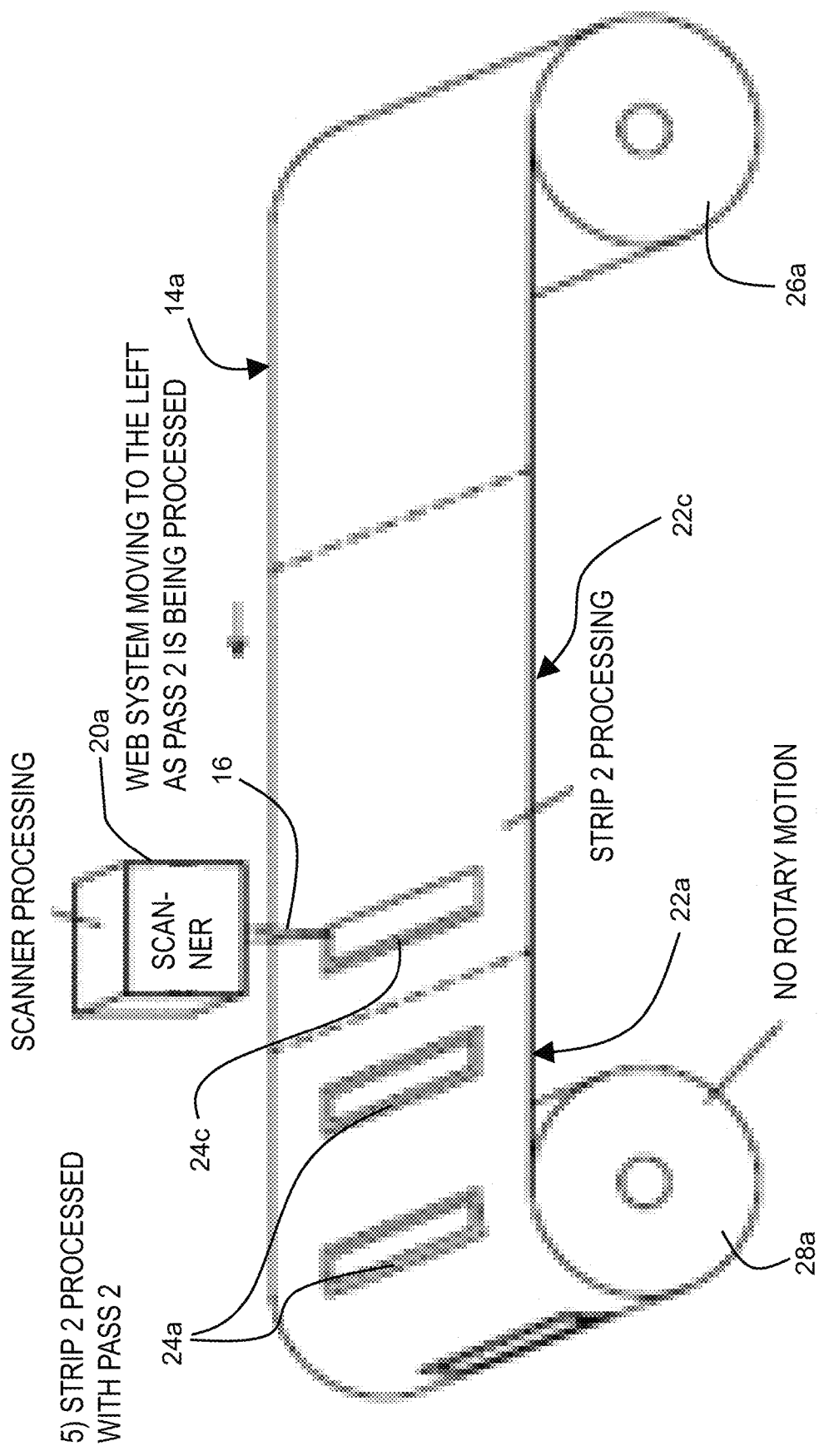

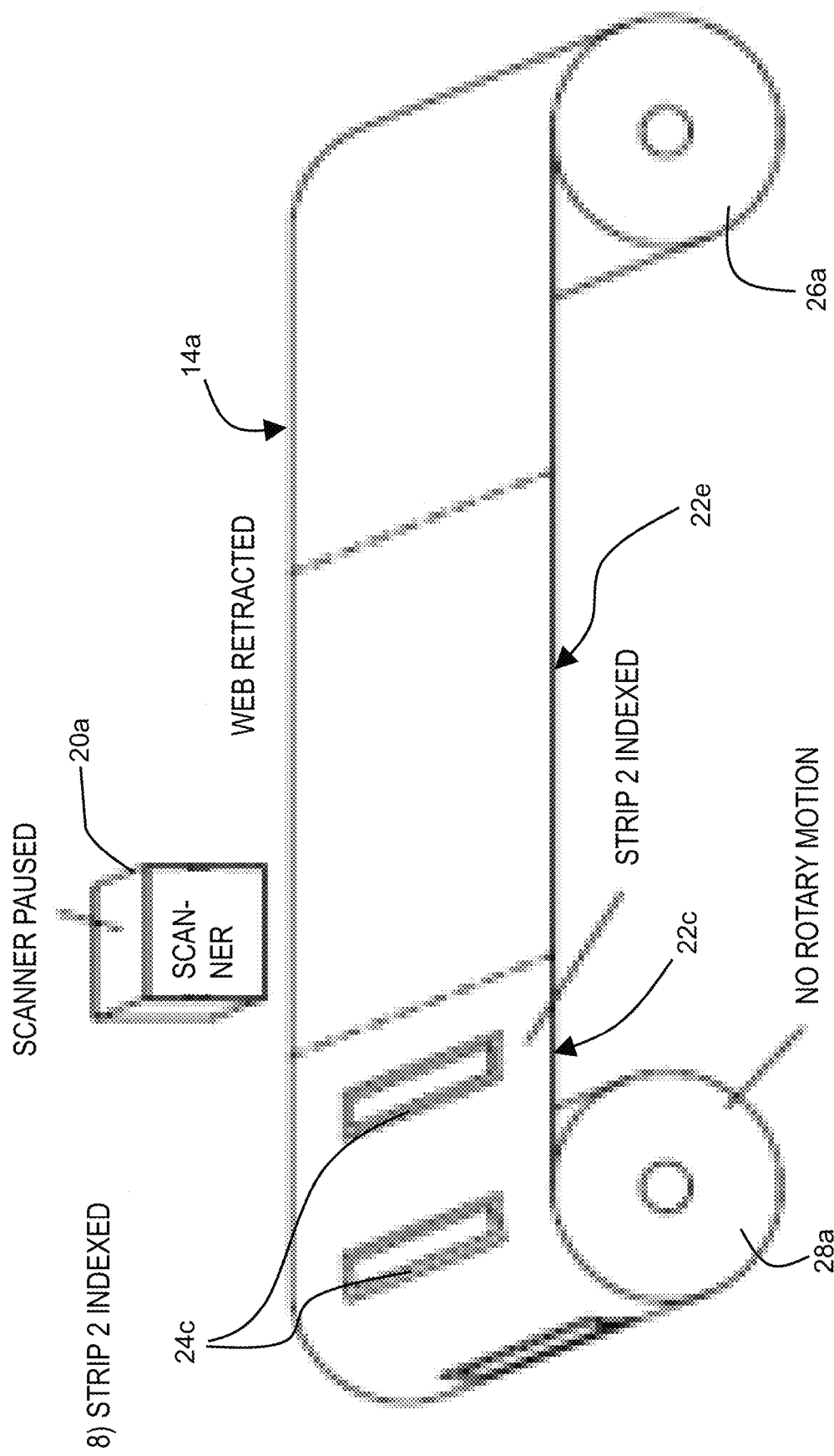

LASER STRIP PROCESSING

CROSS-REFERENCE TO RELATED APPLICATION

This application claims the priority benefit of U.S. provisional application Ser. No. 63/223,365 filed Jul. 19, 2021. The aforementioned application is incorporated herein by reference in its entirety.

BACKGROUND

Industrial laser systems have become a commonplace tool used to produce a variety of products. While the technology has advanced, the cost of laser processing over more conventional processing, if available, still plagues the laser industry. Laser processing may be a viable alternative and may even offer advantages over conventional processing approaches but may not be chosen due to higher processing costs. Fortunately, as the technology has advanced it has allowed for a novel new spin on a now more mature tool.

One of the most cost-effective laser processing methods available is to process a web of material in a "cut on the fly" mode of operation. A roll of material is loaded onto a laser based web system and advanced, typically at a constant speed established by the available laser power in conjunction with the capability of a steered beam/scanning system. The speed of the web is typically monitored via an encoder which actively updates the controller and coordinates the laser processing activities. The web based laser system operates on its own for a period of time until the input or the output rolls of material require operator intervention. The processing is then interrupted until the input and output rolls are dealt with.

There are instances where a web based material and the desired patterns require a slower mode of operation to be chosen such as "step and repeat." This mode of operation is sometimes needed when portions of the web need to be removed and/or tight tolerances are required. In this mode of operation, the web is typically advanced over a tooling template with cut out portions that allow the desired portions of the web to be laser processed and evacuated into a vacuum system through the cut outs in the template. After the laser processing is complete, the web is advanced to the next section, and the process repeats. Other web interruptions are the same as that in a "cut on the fly" mode of operation. However, due to the constant stopping and starting of the web over the template, the time to process a given roll of material is much longer and therefor more expensive.

There are many other laser processing systems and modes of operation being utilized in the industry as well. A sheet based laser processing system is one such system. In this instance, a sheet of material is typically loaded onto a work support vacuum table and then laser processed in either a "step and repeat" fashion or in a "cut on the fly" fashion.

SUMMARY

An aspect of one embodiment of the present disclosure relates to a method of laser processing a moving web in a laser processing system, the method comprises laser processing a plurality of parts during a first pass of the moving web below a laser beam, pausing the laser processing upon completion of the first pass, and indexing the web simultaneously while retracting the table which supports the web, to a starting point for laser processing before resuming laser processing for a second pass of the moving web below the laser beam.

In this embodiment the web is supported on a table that is movable along at least one of the X or Y axis within the laser processing system, and retracting the table comprises moving the table along at least one of the X or Y axis to adjust the position of the web with respect to the laser beam, while the indexing of the web itself comprises a secondary motion system also supported on the table. The secondary motion system may be a nip drive or a hitch feed for proper indexing of the web.

Another embodiment of the present disclosure relates to a method for laser processing a web and providing a laser system for production of a laser beam. The laser system comprises a first web and a second web. The method includes moving the first web in a first web direction and laser processing a first strip during a first pass of the first web through a laser processing window; pausing the laser processing of the first web after completion of the first pass; moving the second web in a second web direction and laser processing a second strip during a first pass of the second web through the laser processing window; indexing the first web while laser processing the second web; pausing the laser processing of the second web after completion of the first pass on the second web; and resuming the laser processing of the first web for carrying out a second pass on the first web.

Indexing the second web occurs while laser processing the first web.

The method further includes alternating laser processing of the first web while indexing the second web and laser processing of the second web while indexing the first web.

The laser processing system further comprises a table supporting the first and second webs, the table moveable in the X and Y directions within the laser processing system and the method further comprises retracting the table to move the first and second webs with respect to a laser beam such that either the first or second web is in the laser processing window with the other web outside of the laser processing window.

The first web direction and the second web direction are opposing directions.

Yet another embodiment of the present disclosure relates to a method for laser processing a web with a laser system for production of a laser beam, the laser system comprising a first web, a second web, a first scanner and a second scanner, each scanner for alternately directing the laser beam to a laser processing window for the first web or second web, respectively. The method includes directing the laser beam to the first web with the first scanner and moving the first web in a first direction through the laser processing window of the first scanner and laser processing a first strip of the web; pausing the laser processing of the first web after completion of the first pass; switching the laser beam from the first scanner to the second scanner; moving the second web in a second direction through the laser processing window of the second scanner and laser processing a first strip of the second web; indexing the first web while laser processing the second web; pausing the laser processing of the second web after completion of the first strip; switching the laser beam from the second scanner to the first scanner; and resuming the laser processing of the first web for carrying out a second strip on the first web.

The method further comprises providing an X-Y axis moveable table supporting the first and second webs in the laser processing system and retracting the table and indexing the first or second web while laser processing the other web.

In one or more embodiments, the first direction and the second direction are opposing directions.

In one or more embodiments, the first direction and the second direction are the same direction.

The laser processing system further comprises a high-speed switch for switching the laser beam between the first and second scanner to substantially reduce a length of the pause between passes.

Another embodiment of the present disclosure relates to a method for laser processing a web with a laser system for production of a laser beam, the laser system comprising a first web, a second web, a first scanner for directing the laser beam to the first web and a second scanner for directing the laser beam to the second web. The method includes laser processing a first strip of parts on the first web with the first scanner; pausing the laser processing of the first web after completion of a first strip; switching the laser beam from the first scanner to the second scanner; laser processing a first strip of parts on the second web with the second scanner; pausing the laser processing of the second web after completion of the first pass; switching the laser beam from the second scanner back to the first scanner; and resuming the laser processing of the first web for carrying out a second strip.

Indexing the first web and retracting the first scanner occurs concurrently with pausing the laser processing of the first web while laser processing the second web.

Indexing the second web and retracting the second scanner occurs concurrently with pausing the laser processing of the second web while laser processing the first web.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

FIGS. 5A-5H depicts a flow chart illustrating an embodiment for processing a first and a second strip of parts.

DETAILED DESCRIPTION

Figure 1A:
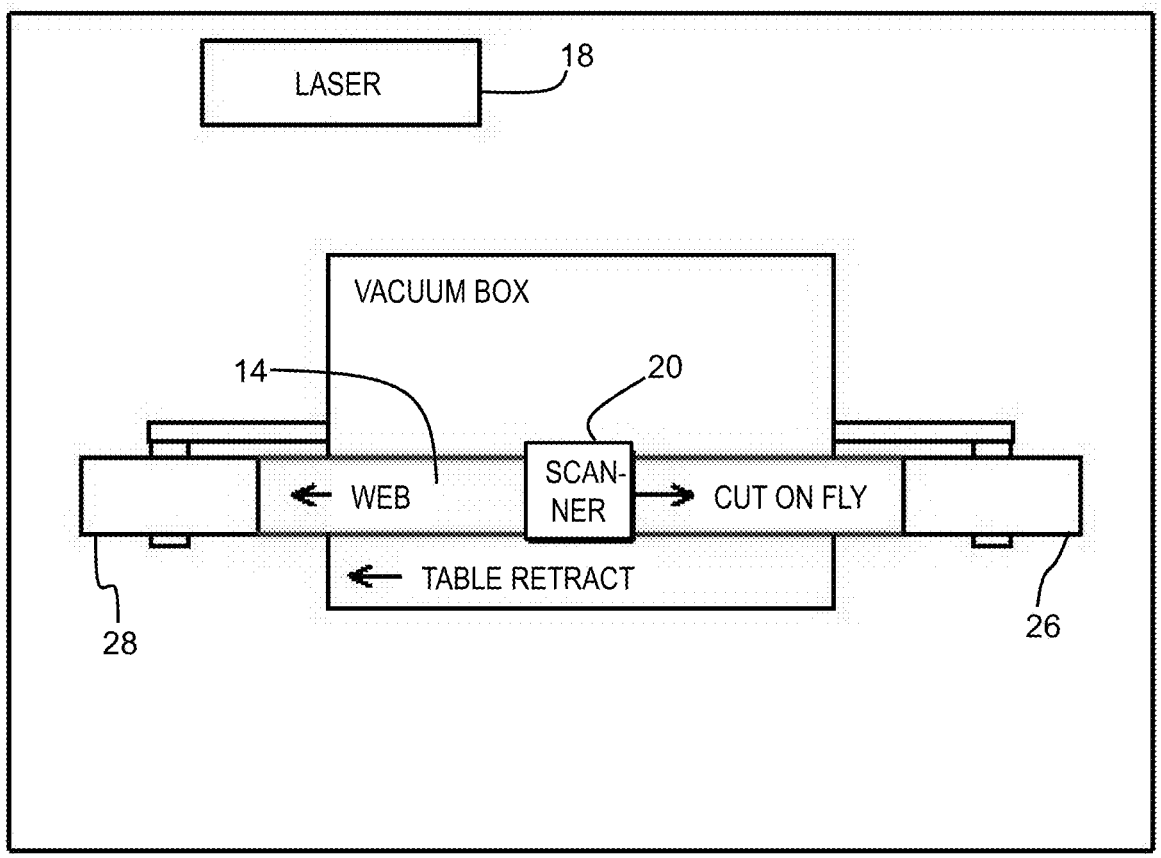
FIGS. 1A and 1B are top and side views, respectively, illustrating a system and method for continuous laser processing in a step and repeat manner.

The terms "a" or "an," as used herein, are defined as one or more than one. The term "another," as used herein, is defined as at least a second or more. The terms "including" and/or "having" as used herein, are defined as "comprising" (i.e., open transition). Unless specifically stated otherwise, the terms "attached," "coupled," "operatively coupled," "joined," and the like are defined as indirectly or directly connected.

As used in this application, the terms "front," "rear," "upper," "lower," "upwardly," "downwardly," "left," "right," and other orientation descriptors are intended to facilitate the description of the exemplary embodiment(s) of the present invention, and are not intended to limit the structure thereof to any particular position or orientation.

Systems and methods described herein support laser processing a section of web, the section referred to herein also as a "strip" in a "step and repeat" manner while doing so with a continuously moving web which moves the strip relative to the laser. Thus, multiple parts can be cut using a step and repeat process for cutting the individual parts, and doing so while laser processing the strip in a substantially continuous manner. The methods described herein use a type of "step and repeat" laser processing mechanism but in a continuous manner where laser downtime or pauses in laser processing are substantially reduced or eliminated. Processing can be done in a continuous manner such that the methods result in a substantial increase in throughput for parts, including complex parts, as for example, compared to traditional "step and repeat" laser processing. Certain web based substrates, desired laser processing patterns, portions of web requiring removal or cutting rather than perforation, tighter tolerances, or combinations thereof require slower modes of laser processing operation. For example, where a step and repeat processing of cutting the parts is required, the methods described herein significantly increase the throughput of this "step and repeat" laser processing.

A laser processing system referred to herein is a system for processing (e.g., perforating, scoring, or cutting) a material through the use of laser beam technology. Lasers provide a very efficient method of cutting, scoring, perforating, or otherwise preparing selected materials for various end uses over the old mechanical systems, which may include die systems or pin type roller perforators. Lasers cut, score, or perforate the material through the use of a collimated amplified beam of light that terminates in a focal point. It is at or near the focal point of the beam that processing typically occurs. Intense energy at the focal point processes the material in what can be described as essentially a vaporizing, burning, or ablating process.

An assembly for laser processing the material as described herein comprises a laser source in communication with optics for directing the beam or multiple beams to the material for processing. The material for processing may also be referred to herein after as a "substrate." The substrate may be stationary during laser processing, while the laser beam moves along a length of the substrate to produce one or more cuts in the substrate. In such embodiments, a scanner is provided that is movable in the X and/or Y directions within the laser system and where the scanner directs the laser beam to the substrate. Additionally, or alternatively, the substrate may be a moving web such that the substrate moves through the laser assembly during laser processing. In such embodiments, the web moves below the scanner that directs the laser beam to the web moving there below. This allows a web of substrate to be processed continuously while passing below the laser beam concurrently during processing to produce a plurality of holes, perforations, or cuts on the substrate.

A focal point(s) of the laser beam(s) is/are directed to a surface of the substrate using a process wherein a control system for the laser processing system is configured to steer a beam or a galvanometer system for directing the focal point to and along the substrate. This may also be referred to generally as a laser scanning process, which requires controlling and directing the laser beam(s) for precision perforation (or scoring) along a selected pattern. A controller sends commands to the laser processing assembly to direct and pulse the laser beam(s) precisely as the substrate is positioned for processing (whether the substrate is stationary or moving) to cut or otherwise process the substrate according to the selected pattern. The pattern may comprise rows and/or columns of aligned perforations, random patterns of perforations. The laser beam(s) may be pulsed when processing the substrate to produce one or more holes, perforations, or cuts for example.

The laser assembly may comprise, for example, a CO laser, a $CO_2$ laser or other lasers and/or laser wavelengths (e.g., UV wavelength) for processing the substrate. The laser system and settings are selected based on the construction of the material being processed.

The laser assembly may also comprise a work support vacuum table which can be positioned beneath the web or otherwise below the substrate within or near the processing window.

The methods described herein provide a new mode of operation that allows the benefits of the "step and repeat" mode of operation, while achieving a throughput of a web based "cut on the fly" system. To achieve this, strips of parts may be laser produced in a continuous manner, and in some embodiments while an adjacent second web is being indexed or advanced for immediately subsequent laser processing. These processes then may alternate back and forth between webs such that overall, the process of laser processing is substantially continuous but the strips which include multiple parts to be cut from the web are processed in the step and repeat manner. When indexing the first web in an indexing direction and indexing the second web in an indexing direction, the indexing directions may be the same direction or opposing directions. In the embodiments described in further detail herein for ease of description, each web is indexed in opposing directions. However, in one or more embodiments a strip of web (a plurality of parts) may require the web to pass below the laser beam twice to complete laser processing of the strip of web. The methods herein, whether using a single, dual or plural web arrangement thus allow for processing a strip of parts rather than a single part per each web index. This increases the laser system throughput while maintaining the aforementioned benefits.

In one or more embodiments where for example a dual adjacent web is provided, the throughput is further increased in the laser system. With one or more of the assemblies and corresponding methods described herein, throughput from a given conventional web based laser "step and repeat" process can increase by as much as 400% while utilizing the same laser power and the same floor space. Whereas conventional laser processing methods would require four systems to produce the equivalent throughput as the "dual strip processing" mode of operation according to one or more methods described herein.

The methods described herein combine continuous laser processing of a web of material with a step and repeat process for laser cutting parts from a material to increase productivity of laser processing.

In one or more embodiments, a method referred to as web strip processing comprises adding an additional motion axis (or axes) to move either the steered beam system or a section of the web (with or without the web system itself). The methods comprise continuously processing a strip of parts on the web and indexing the web after processing the strip of parts which allows for subsequent laser processing of the same or a subsequent strip of parts. The throughput increase is realized by laser processing more parts per web index event as the continuous processing is nearly or substantially continuous for each given strip of parts. In general, the longer the strip of parts is between web indexes, the higher the throughput increase is.

In one or more embodiments, a method referred to as dual strip processing, comprises adding an additional motion axis (or axes) to move either the steered beam system or the sections of web (with or without the web system themselves). The methods comprise processing a strip of parts in a continuous manner and alternating laser cutting and web indexing between two webs. One web is laser cut while the other web is indexed and vice versa. The only non-productive laser time is the time to switch from the first web to the second web and this non-productive time can be decreased further and essentially eliminated by switching the laser beam between webs as compared to moving the webs between a laser processing position below the laser beam or scanner and an indexing position away from the laser beam. While the web can be moved to the laser processing position which is below a laser scanner and subject to the laser beam by way of moving an X-Y axis moveable table supporting the web section, additionally or alternatively, a high speed switch can be used with an additional steered beam setup to switch the laser beam from the first web to the second web. This substantially eliminates the time to switch from the first web to the second web by moving the webs.

In one or more embodiments herein, a web of materials is indexed between laser processing times. Indexing of the web or indexing events as used herein, may refer to the web of material provided in the laser system and its movement with respect to the laser processing system. For example, the web of material may be provided as a continuous roll of substrate that is fed from a supply roll to a take-up roll, the length of the web between the supply roll and take up roll is set per laser processing parameters and this length of web extends through the laser processing window (e.g., below the area in which the laser beam is directed for cutting, etc.). In one or more embodiments the length of web between the supply roll and take up roll is the strip that is processed to produce a strip of parts. This strip may extend over a vacuum table and also be supported by one or more nip rollers between the supply roll and take up roll. When indexing events occur, the strip is moved in the web direction, that is, in a direction from the supply roll to the take-up roll. When indexing events occur for second, third or additional passes of the web for processing strips in the step and repeat manner of laser processing, the web has traveled in the web direction during laser processing and is then indexed by being moved in typically the reverse direction towards and onto the take-up roll. After the strip of parts is fully processed, a new strip of parts can be laser processed according to the methods herein by indexing the web in the web direction to a new strip for processing subsequent parts. Likewise, in systems or methods described herein where the web is stationary during laser processing but the scanner is moved along the strip, indexing of the web still occurs in the web direction after completion of a strip of parts.

Figure 1B:
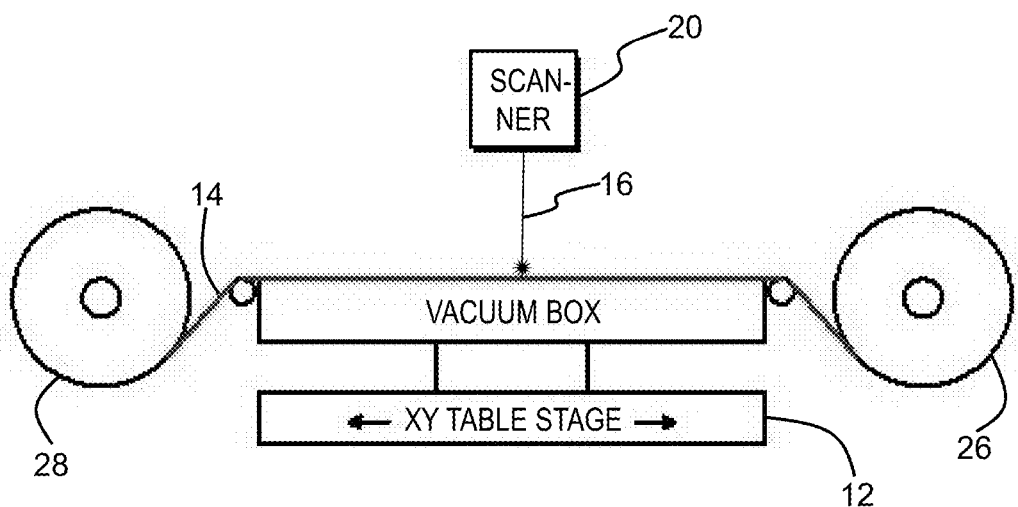
Figure 2A:
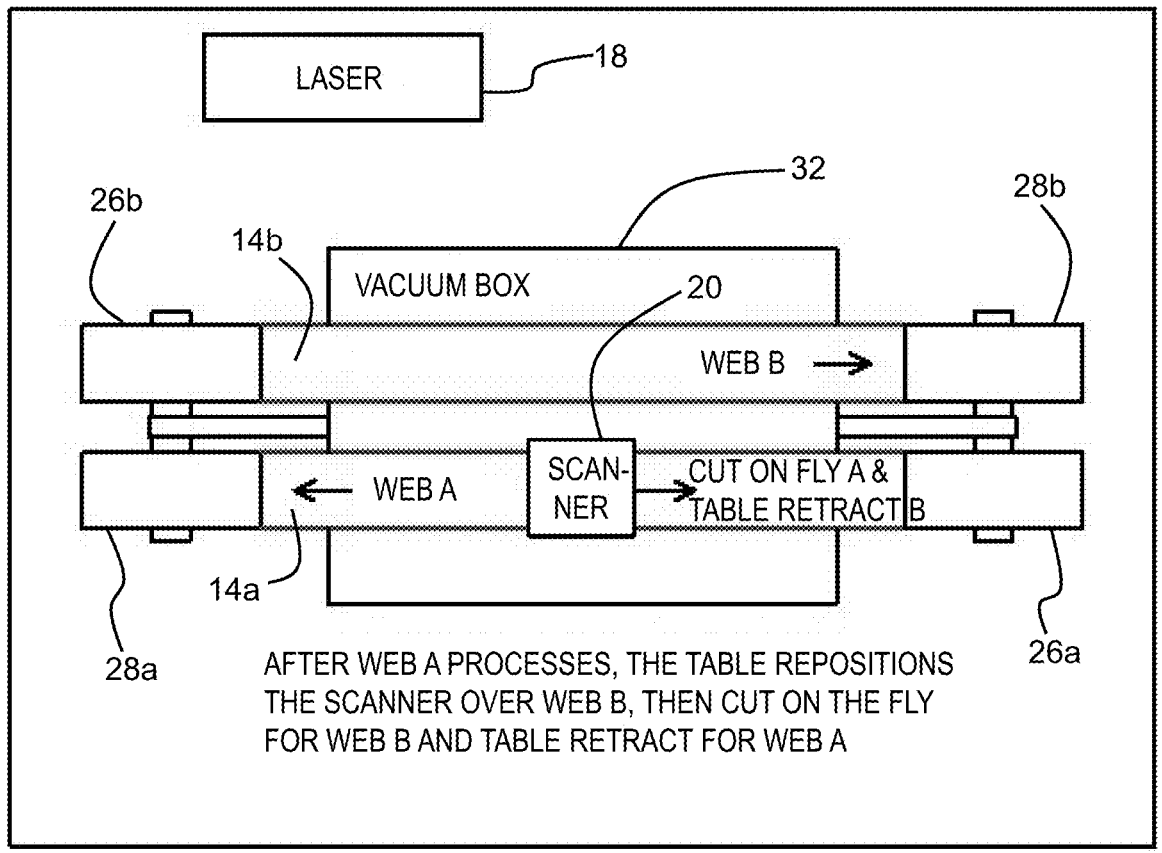
FIGS. 2A and 2B are top and side views, respectively, illustrating another embodiment for continuous laser processing in a step and repeat manner.
Figure 2B:
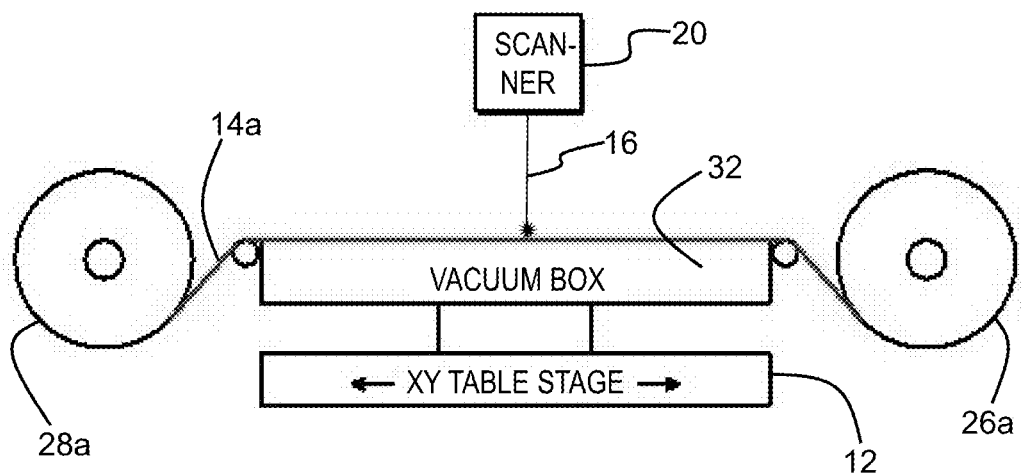

With respect to the drawing figures, like or similar reference numerals are used to describe like or analogous items (e.g., the apparatus 10a in FIGS. 1A and 1B corresponds to the apparatus 10b in FIGS. 2A and 2B, so forth). The description in reference to any given reference numeral herein is equally applicable to that reference numeral in the other views or embodiments, or any analogous reference numerals in the other views or embodiments, unless specifically stated otherwise.

In further detail, as illustrated in the example of FIGS. 1A and 1B, a laser processing system, designated generally as 10a, includes table stage 12 provided below a web 14 where the table stage 12 is movable in X and Y directions within the laser processing system 10a to also move the web 14. The table stage 12 effectively adds an additional axis of movement to the laser processing system 10a. Laser processing comprises moving the web 14 typically in a web direction below a laser beam 16 emitted by a laser 18 directed to the web 14 via a scanner 20 and cutting a strip 22 of parts 24 as the web 14 passes through a laser processing window. The scanner 20 directing the laser beam 16 on the web 14 is fixed in position within the system 10a. When the scanner 20 is fixed in position, the web 14 continuously moves below the scanner 20 during processing each strip 22 of the web. The strip 22 of parts 24 may pass through the laser processing window multiple times before the strip 22 is considered fully laser processed and the plurality of parts 24 cut on the strip. Between each strip 22 of the web 14, the web 14 is indexed to move the web 14 to a starting position for the next strip 22 below the laser beam 16.

Once the strip 22 of parts 24 is laser processed or completed, laser processing is paused, the web 14 is indexed, and the table stage 12 is typically retracted. After a strip 22 is indexed, the strip 22 is finished processing. However, processing of a strip 22 may involve more than one "pass" of the laser 18 on the strip, or may incorporate movement of the laser beam 16 in multiple directions. Laser processing then resumes, and the web 14 resumes movement, typically in the web direction, under the scanner 20. Indexing can occur for the same and subsequent strips 22 in a similar manner as the web 14 can be a continuous web of material provided on a roll 26 and directed over the table 12 to a take-up roll 28 as described previously above. When subsequent strips 22 on the web 14 are to be processed, the web 14 is advanced to a new strip 22 and the method above can be repeated. This method is a laser processing method for a moving single strip web 14 on an X-Y moveable table 12 with a fixed position scanner head 20. This method increases throughput as a strip 22 of parts 24, that is, multiple parts 24 are laser processed before the web 14 is indexed and the laser processing repeated.

In the example of FIG. 2, a laser processing system 10b is configured for a moving double strip web 14a, 14b on the X-Y movable table stage 12, with a fixed position scanner 20. In this example, a strip 22 of parts 24 is processed on a first moving web 14a. After the web 14a has made a first pass in laser processing a strip 22a of parts 24a, laser processing is paused and the table stage 12 is moved along the X and/or Y axis to move the first web 14a out of the laser processing window while moving a second adjacent web 14b to a position under the scanner head 20 and thus in the laser processing window. A first pass of the second web 14b under the laser scanner 20 is then carried out for laser processing the first strip 22b of parts 24b. As the first strip 22b of parts 24b on the second web 14b is moving in the web direction through the laser processing window, the first web 14a is indexed in preparation of a second strip 22c through the laser processing window. After the second web 14b has completed a first pass through the laser processing window, laser processing is paused and the table stage 12 then moves or retracts so that the first web 14a is moved back into the processing window and the second web 14b is moved out of the processing window. A second new strip 22c of the web 14a is laser processed on the first web 14a. This process then may repeat continuously until a selected number of strips 22n of parts 24n are laser cut. The method of repositioning the scanner 20 over a first and second web 14a, 14b and indexing the waiting web concurrently with processing the other web allows for continuously processing strips of parts in a step and repeat manner that can be repeated for each strip as required by the part design being processed. Throughput is increased over the single strip web on the XY table as processing of a second strip occurring while the first strip is retracting for repeating in the "step and repeat" method of laser processing. Thus, the laser system 10b may be nearly continuously processing parts on either the first or second web with pauses in laser processing occurring only when the table stage is moved to switch between webs.

Figure 3A:
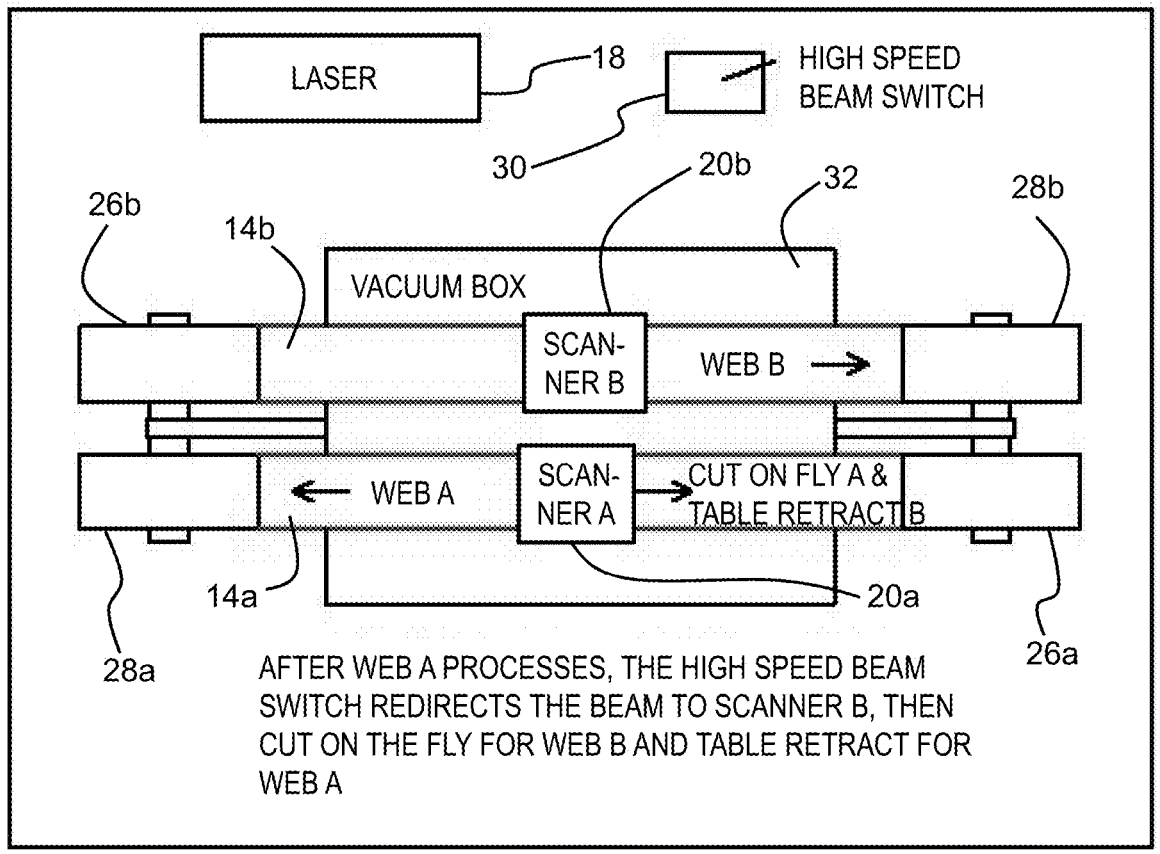
FIGS. 3A and 3B are top and side views, respectively, illustrating yet another embodiment for continuous laser processing in a step and repeat manner.
Figure 3B:
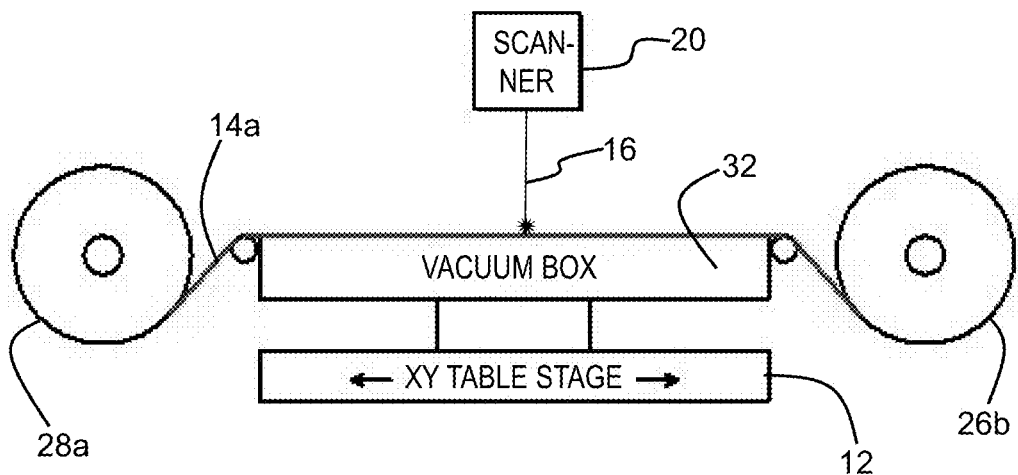

In the example illustrated in FIG. 3, a laser processing system 10c is illustrated for a moving double strip web on an XY movable table with two fixed position scanners. In this example, two scanners 20a, 20b are provided in the laser processing system 10c, one scanner provided with each web 14a, 14b. The laser beam 16 is switched between the scanners 20a, 20b. A first strip 22a of parts 24a is laser processed on a first moving web 14a in a first web direction, with the laser processing window according to the first scanner 20a. After the first strip 22a of parts 24a is laser processed, a high-speed laser beam switch 30 actuates and redirects the laser beam 16 from the first scanner 20a to the second scanner 20b. A first strip 22b of parts 24b is then laser processed on the second web 14b, the laser processing continuous and concurrent with the moving web 14b which moves in a second web direction through the laser processing window of the second scanner 20b. Concurrently, the first web 14a is indexed to a new strip 22c for additional parts 24c. The first web 14a indexes the strip 22a while the second web 14b is being laser processed. In such an embodiment, the first web direction and second web direction are opposing directions on or parallel to the same axis. This allows the table 12 to retract the first web 14a while the second web 14b is laser processed and vice versa. Once the second scanner's strip 22b of parts 24b is laser processed, the high speed laser beam switch 30 redirects the laser beam 16 from the second scanner 20b back to the first scanner 20a. The first web 14a is then laser processed again. While the first web 14a is being laser processed, the second web 14b is indexed and retracted to a starting position for a second strip 22d of parts 24d. This method can be repeated as necessary for laser processing parts having various designs. Throughput is further increased over the single strip web on the X-Y axis movable table stage method as well as the double strip web on the X-Y axis movable table stage methods as laser downtime is significantly reduced by the high speed switching of the laser beam 16 between the first and second scanner heads 20a, 20b and the indexing and retracting of one web while the other web is laser processed.

Figure 4A:
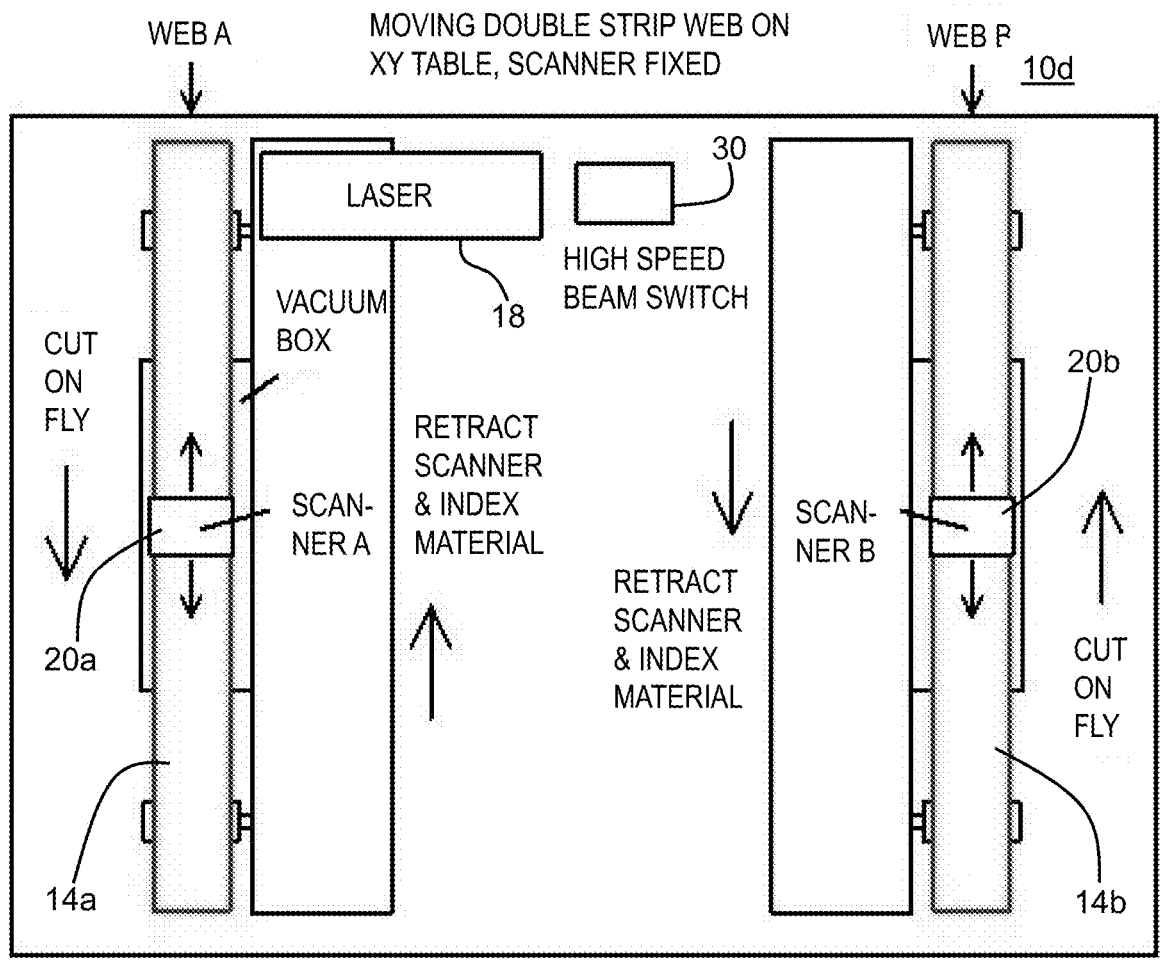
FIGS. 4A and 4B are top and side views, respectively, illustrating another embodiment for continuous laser processing in a step and repeat manner.
Figure 4B:
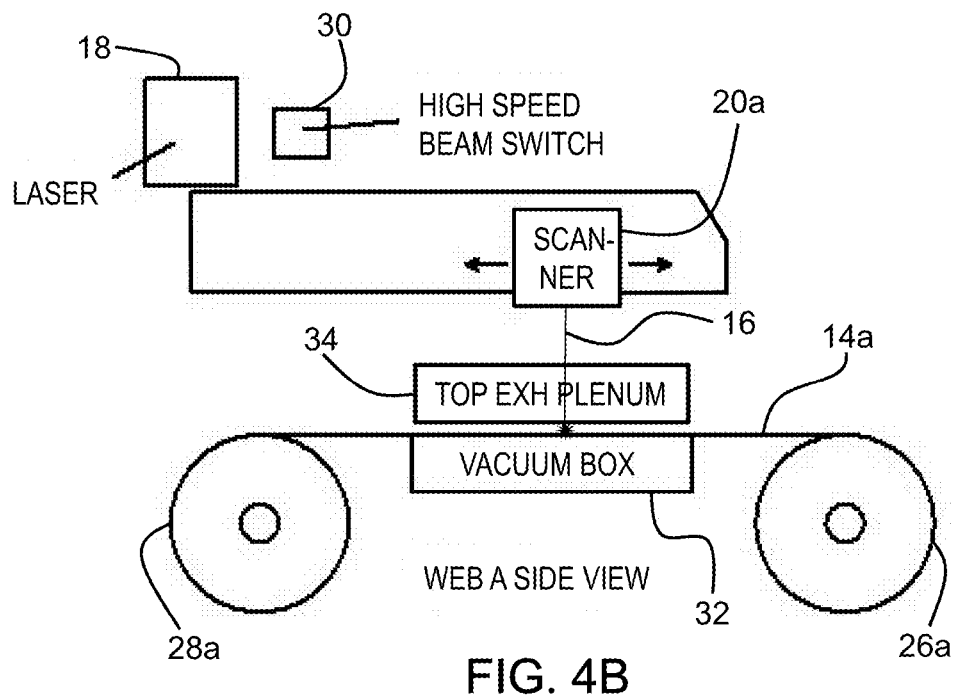

In the example of FIG. 4, a laser system 10d is configured for combining continuous laser processing of a web or webs with the step and repeat process of cutting parts from a web. The laser processing system 10d is configured with dual moving scanners 20a, 20b and dual fixed position strip webs 14a, 14b. In this example, no X-Y axis movable table is required and thus such a table stage is eliminated from this system. Instead, two movable scanners 20a, 20b are provided over two webs 14a, 14b, respectively, where the web assemblies are stationary within the laser system 10d. In this example, the scanners 20a, 20b are each movable in reciprocal directions over its corresponding web. The strip of material 22 may be stationary during laser processing as the scanner moves the laser processing window along the strip for cutting parts. However, the web is moved during indexing events and/or when moving the completed strip through the system and indexing to a subsequent strip for laser processing additional parts. A high-speed beam switch 30 is also provided to switch the laser beam 16 between the first and second scanners 20a, 20b. The laser processing system 10d may include a vacuum box 32 for debris extraction and/or retaining the web in place during laser processing and an upper plenum 34 for removal of smoke and debris from the laser processing system 10d. The two moving scanners 20a, 20b may each have X-Y axis motion capabilities.

The method of this example comprises laser processing the first stationary web 14a in a continuous manner by moving the scanner along a length of the web 14a during laser processing, also referred to as a "pass." The laser beam 16 continuously cuts the web 14a during a pass. After a pass on the first web 14a, the high-speed beam switch 30 is actuated and switches the laser beam 16 from the first scanner 20a to the second scanner 20b. The second scanner 20b then traverses the second strip 14b and completes a pass. While the second web 14b is being laser processed, the first scanner head 20a is retracting to a starting position for a subsequent pass on the first web 14a. The web 14a may also be indexed as necessary at this point. After a pass on the second web 14b is completed, the high-speed beam switch 30 actuates and switches the laser beam 16 back to the first scanner 20a over the first web 14a for a pass on the first web 14a. As the first scanner 20a is moved along a length of the first web 14a, the second scanner 20b is retracted to its starting position over the second web 14b. The second web 14b may also be indexed as necessary at this point. This method includes switching a laser beam 16 between two adjacent webs and repositioning the idle scanner for additional passes while the active scanner is passing along the adjacent web. This method can be repeated as necessary for laser processing selected designs for parts. Throughput is further increased over the previous methods above as laser downtime is significantly eliminated by the high speed switching of the laser beam 16 between the first and second scanner heads 20a, 20b as well as a significant reduction in moving mass with the fixed web assemblies allowing larger diameter rolls of material and/or faster cut on the fly speeds (dependent upon patterns).

Figure 5:
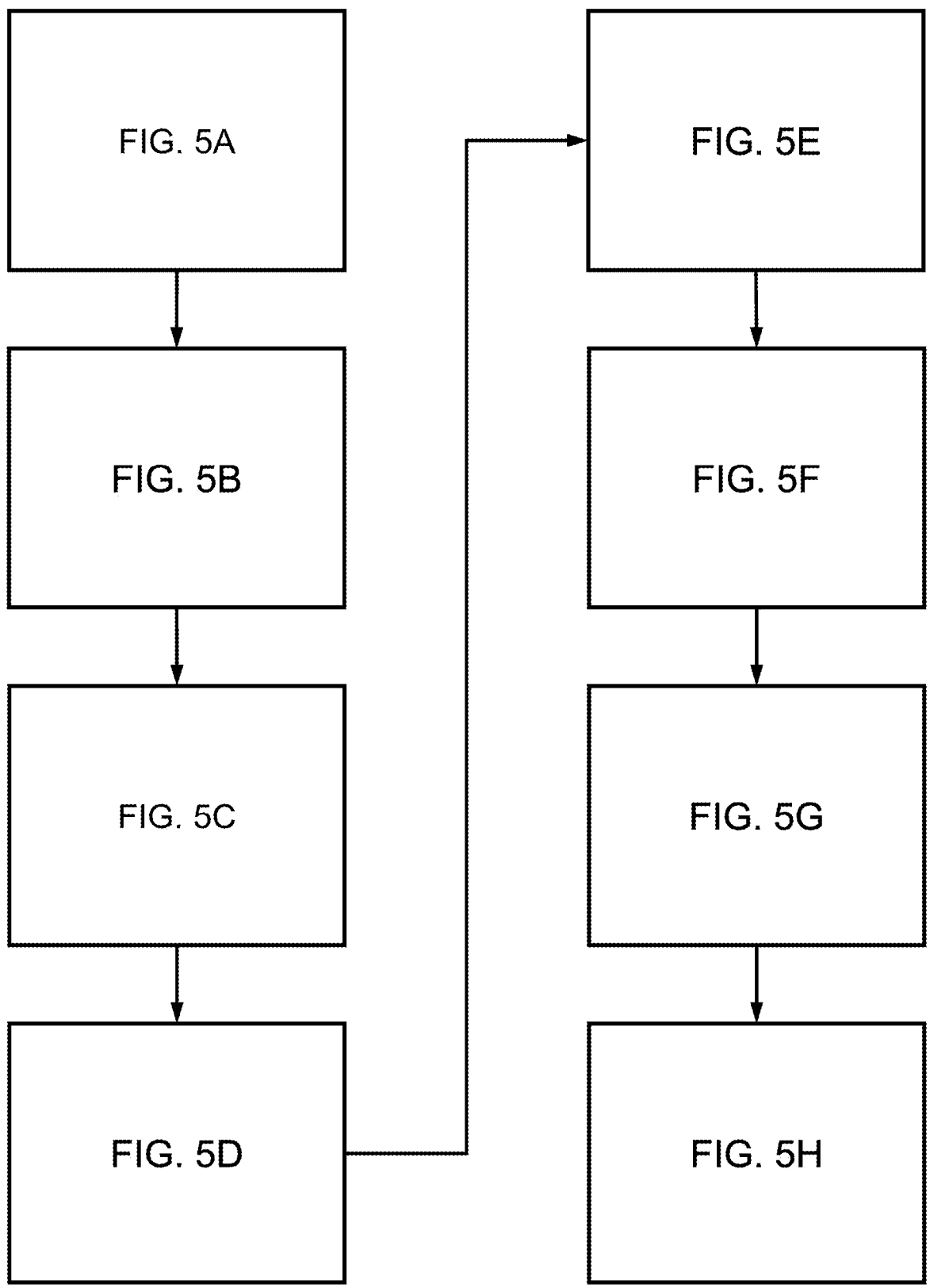
FIG. 5 comprising
Figure 5B:
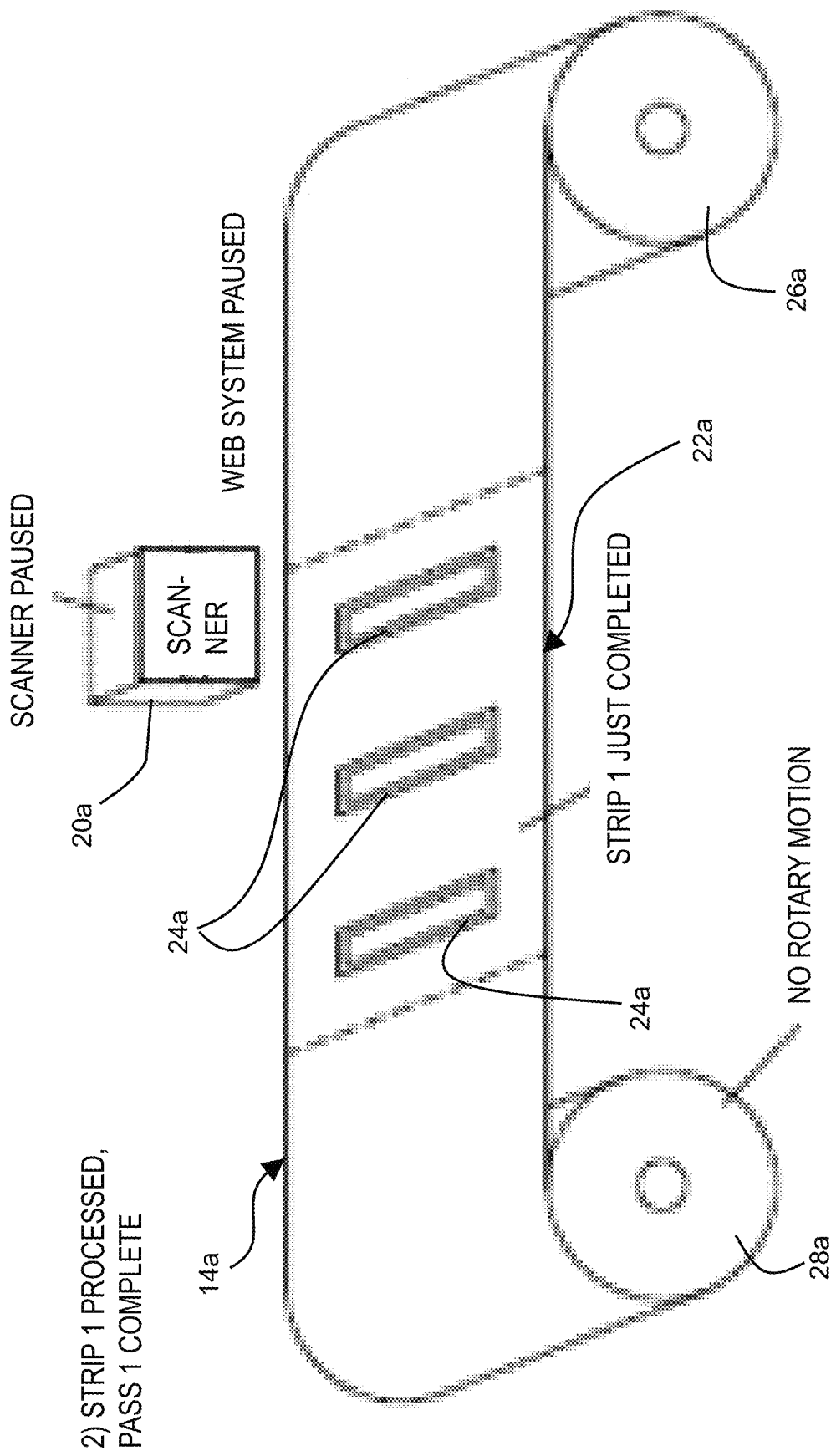
Figure 6:
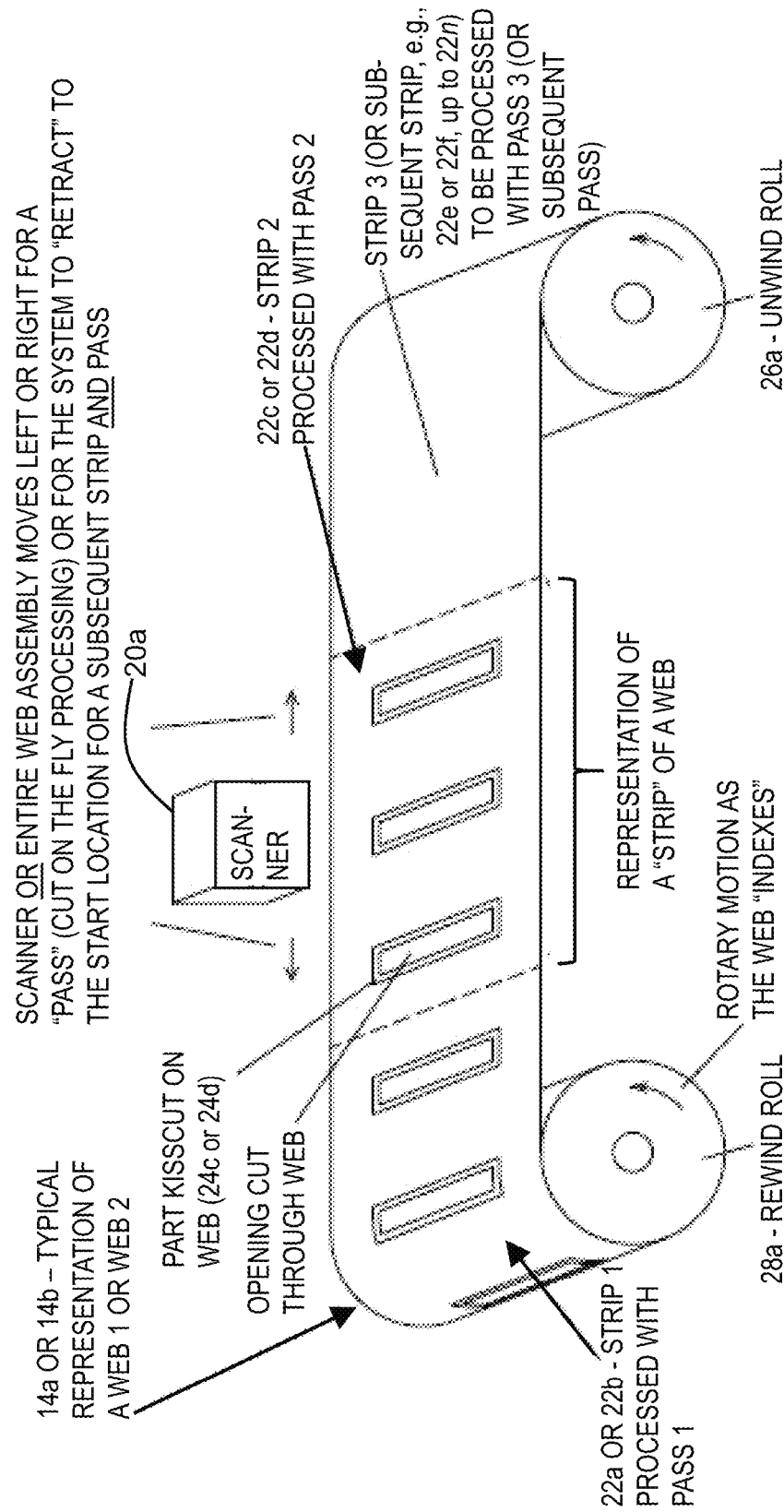
FIG. 6 illustrates a web assembly and scanner arrangement according to one or more embodiments herein.

Referring now to FIG. 5, and with reference to FIG. 6, there appears a flow chart illustrating an embodiment for processing a first and a second strip of parts in a laser processing system having two fixed position scanners. The process starts at FIG. 5A, wherein strip 22a of a first web 14a is processed using the scanner 20a. The web system is moved to the left as the first pass is being processed. The process proceeds until the processing of the strip 22a is completed as shown in FIG. 5B, wherein whereupon the scanner 20a and the web system are paused.

Figure 5C:
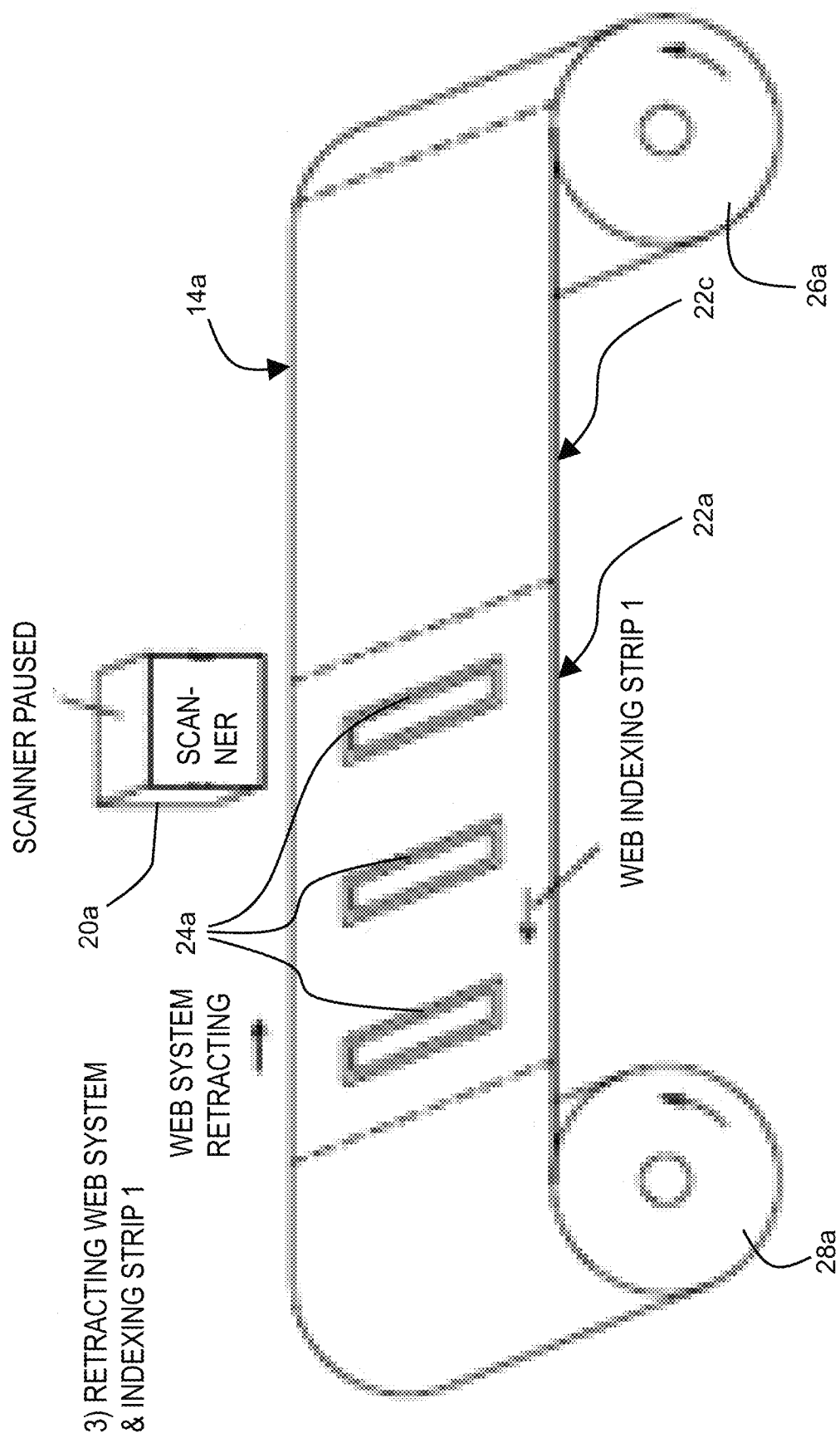
Figure 5F:
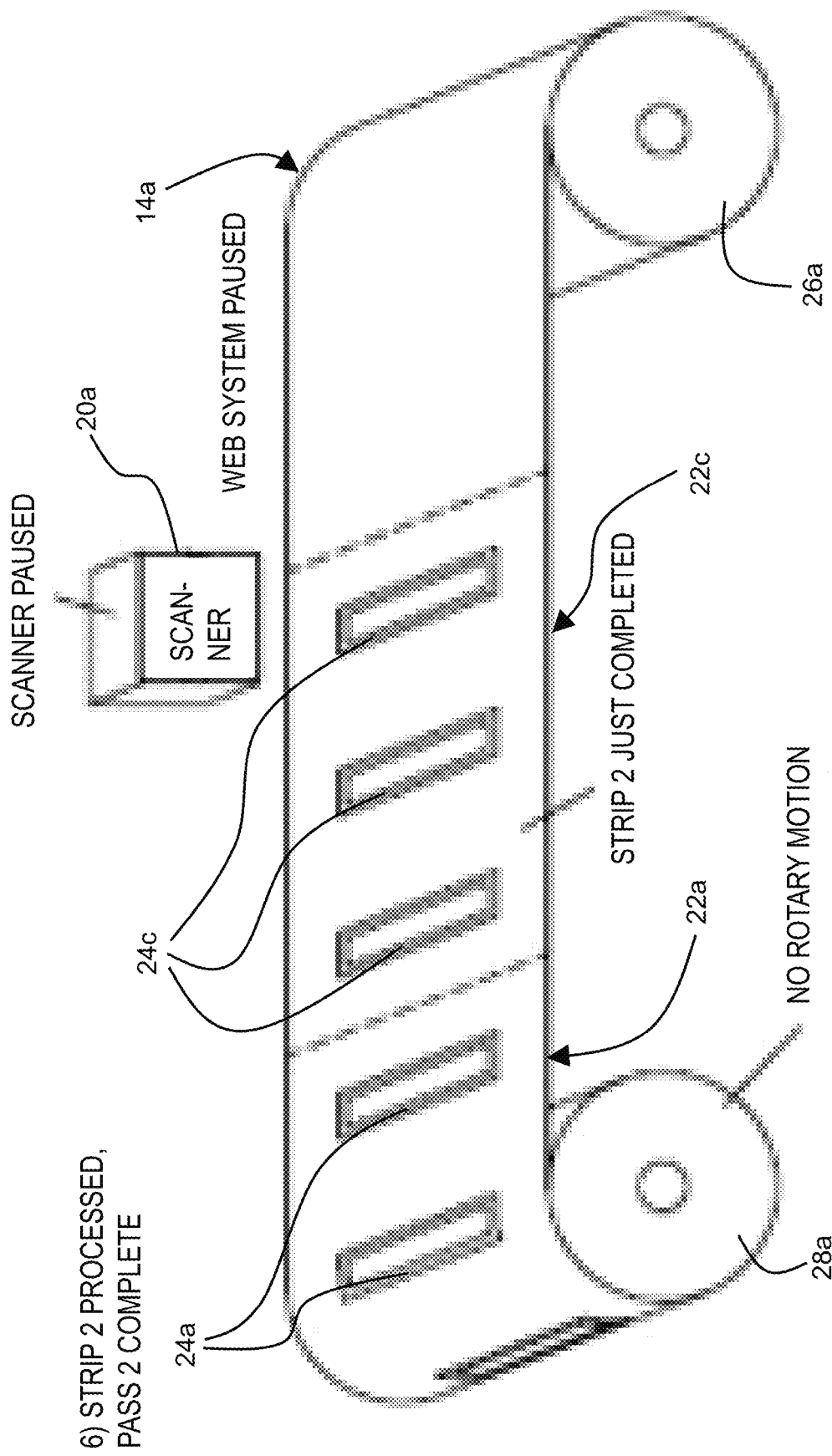

At FIG. 5C, the web system retracts to the right and the web 14a is indexed using the rollers 26a and 28b wherein the strip portion 22a is taken up onto the roll 28a until indexing of the strip 22a is complete, as shown in FIG. 5D. At FIG. 5E, strip 22c of the web 14a is then processed using the scanner 20a. The web system is moved to the left as a second pass is being processed. The process proceeds until the processing of the strip 22c is completed as shown in FIG. 5F, wherein whereupon the scanner 20a and the web system are paused.

Figure 5G:
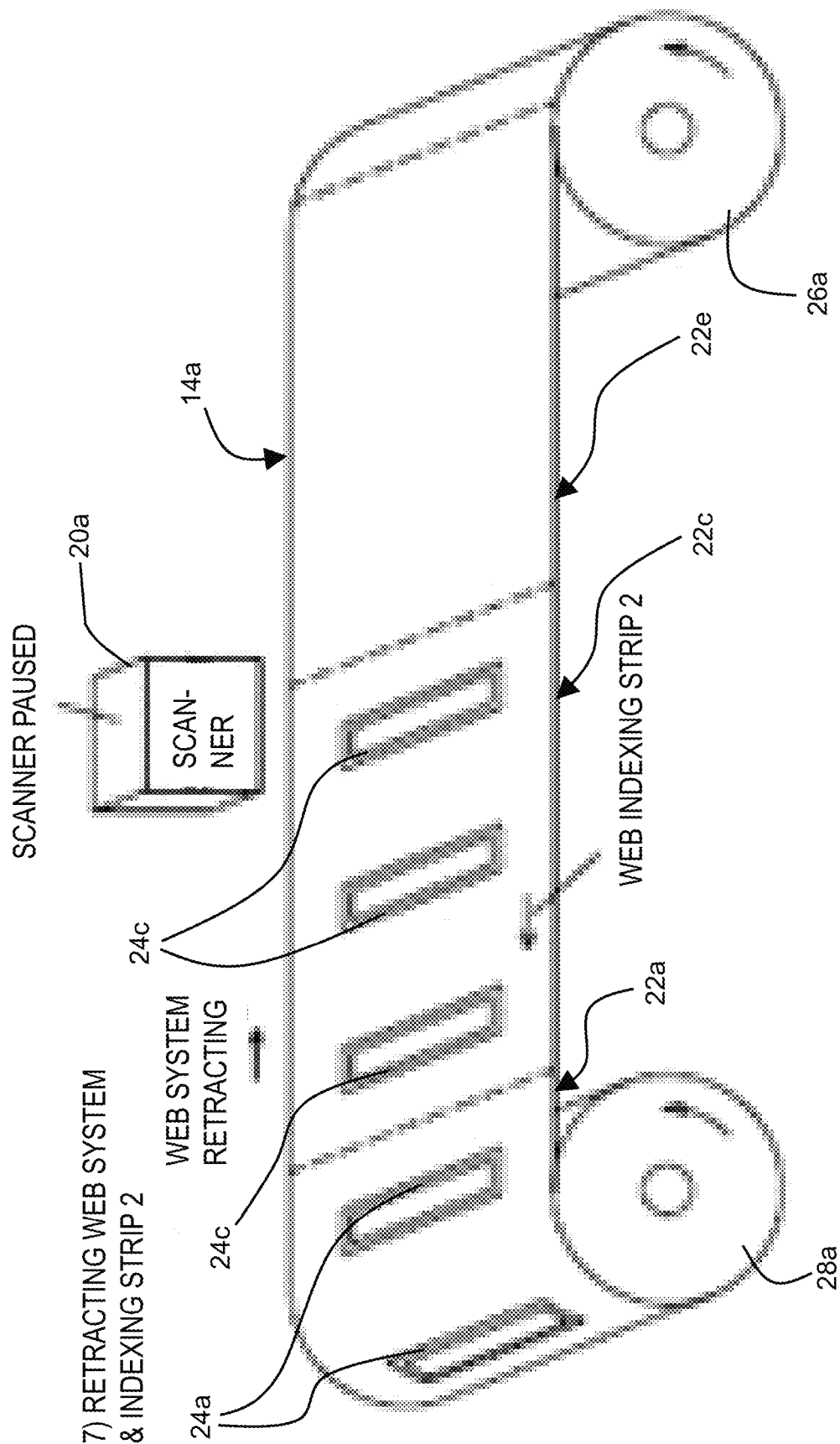

At FIG. 5G, the web system retracts to the right and the web 14a is indexed using the rollers 26a and 28b wherein the strip portion 22c is taken up onto the roll 28a until indexing of the strip 22c is complete, as shown in FIG. 5H. The process then may continue as described above.

For ease of explanation, only a single stage movement for laser processing is detailed and illustrated. The strip of parts or set or pass that is laser processed may involve a single stage movement or may involve multiple stage movements and these may be in multiple directions. Arrows for multi-direction cut on the fly are not detailed in the figures. With one or more methods disclosed herein, especially in the microfluidics area of laser processing, a combination of high accuracies and feature removal can be achieved while maintaining a minimum cost. High accuracies are achievable over conventional cut on the fly web processing in part due to encoder information coming from the table's encoder rather than a wheel encoder placed on the web of material. A further important benefit in the area of microfluidics, available with the "dual strip processing," is the ability to do other important tasks such as stacking parts on the first web while the second web is stationary or placing reagents on the stationary web. These methods allow for the efficient and accurate step and repeat processing of various substrates constructions.

Application of reagent materials, material treatments, lamination and/or stacking of additional materials or parts, and the like beneficial in the manufacture of microfluidic materials is also contemplated and within the scope of this disclosure and could be considered to occur within a set of parts. One or more of the methods described herein may be used for such applications and manufacture of various materials including microfluidic materials.

A more conventional step and repeat process can still be carried out with a strip processing method as described herein with reduced throughput speed; however, this method still improves throughput over a standard web based step and repeat platform.

It is also contemplated and within the scope of this disclosure to utilize registration in conjunction with the strip processing.

Although the present disclosure has been described with reference to preferred embodiments, workers skilled in the art will recognize that changes may be made in form and detail without departing from the spirit and scope of the disclosure. Accordingly, the scope of the invention should be determined solely by the appended claims and their legal equivalents.

What is claimed is:

1. A method of laser processing a moving web in a laser processing system, the method comprising laser processing a plurality of parts during a first pass of the moving web below a laser beam, pausing the laser processing upon completion of the first pass, and retracting the web to return the web to a starting point for laser processing and simultaneously indexing the web before resuming laser processing on a second or subsequent pass of the moving web below the laser beam.

2. The method of claim 1 wherein the web is supported on a table that is movable in along at least one of the X or Y axis within the laser processing system and retracting the web comprises moving the table along at least one of the X or Y axis to adjust the position of the web with respect to the laser beam.

3. A method for laser processing a web, comprising:
providing a laser system for production of a laser beam, the laser system comprising a first web and a second web;

moving the first web in a substantially first web direction and laser processing a first strip during a first pass of the first web through a laser processing window;

pausing the laser processing of the first web after completion of the first pass;

moving the second web in a substantially second web direction and laser processing a second strip during a first pass of the second web through the laser processing window;

indexing the first web while laser processing the second web;

pausing the laser processing of the second web after completion of the first pass on the second web; and resuming the laser processing of the first web for carrying out a second or subsequent pass on the first web.

4. The method of claim 3 and further comprising indexing the second web while laser processing the first web.

5. The method of claim 3 and further comprising alternating laser processing of the first web while indexing the second web and laser processing of the second web while indexing the first web.

6. The method of claim 3 and the laser processing system further comprising a table supporting the first and second webs, the table moveably in the X and Y directions within the laser processing system and the method further comprising retracting the table to move the first and second webs with respect to a laser beam such that either the first or second web is in the laser processing window with the other web outside of the laser processing window.

7. The method of claim 3 wherein the first web direction and the second web direction are opposing directions.

8. The method of claim 3 wherein the first web direction and the second web direction are the same direction.

9. A method for laser processing a web, comprising:
providing a laser system for production of a laser beam, the laser system comprising a first web, a second web, a first scanner and a second scanner, each scanner for alternately directing the laser beam to a laser processing window for the first web or second web, respectively;
directing the laser beam to the first web with the first scanner and moving the first web in a substantially first direction through the laser processing window of the first scanner and laser processing a first strip during a first pass of the web;
pausing the laser processing of the first web after completion of the first pass;
switching the laser beam from the first scanner to the second scanner;
moving the second web in a substantially second direction through the laser processing window of the second scanner and laser processing a first strip during a first pass of the second web;
indexing the first web while laser processing the second web;
pausing the laser processing of the second web after completion of the first pass;
switching the laser beam from the first scanner to the second scanner;
resuming the laser processing of the first web for carrying out a second pass on the first web.

10. The method of claim 9 and further comprising providing an X-Y axis moveable table supporting the first and second webs in the laser processing system and retracting the table to index the first or second web while laser processing the other web.

11. The method of claim 9 wherein the first direction and the second direction are opposing directions or wherein the first direction and the second direction are the same direction.

12. The method of claim 9 wherein the laser processing system further comprises a high-speed switch for switching the laser beam between the first and second scanner to substantially reduce a length of the pause between processing webs.

13. A method for laser processing a web, comprising:
providing a laser system for production of a laser beam, the laser system comprising a first web, a second web, a first scanner for directing the laser beam to the first web and a second scanner for directing the laser beam to the second web;
laser processing a first strip of parts on the first web with the first scanner;
pausing the laser processing of the first web after completion of a first pass;
switching the laser beam from the first scanner to the second scanner;
laser processing a first strip of parts on the second web with the second scanner;
pausing the laser processing of the second web after completion of a first pass;
switching the laser beam from the second scanner back to the first scanner; and
resuming the laser processing of the first web for carrying out a second pass.

14. The method of claim 13 and further comprising indexing the first web or retracting the first scanner concurrently with pausing the laser processing of the first web while laser processing the second web.

15. The method of claim 13 and further comprising indexing the second web or retracting the second scanner concurrently with pausing the laser processing of the second web while laser processing the first web.

* * * * *